United States Patent [19]

Shelton

[11] 4,376,358

[45] Mar. 15, 1983

[54] SURFACE TREATING APPARATUS

[75] Inventor: John J. Shelton, Tuttle, Okla.

[73] Assignee: Robert T. Nelson, Oklahoma City, Okla.

[21] Appl. No.: 752,787

[22] Filed: Dec. 20, 1976

[51] Int. Cl.³ .............................................. B24C 3/06
[52] U.S. Cl. ......................................... 51/429; 51/424
[58] Field of Search ............... 51/9 M, 424, 425, 428, 51/429

[56] References Cited

U.S. PATENT DOCUMENTS

| 3,380,196 | 4/1968 | Mabille | 51/425 |
| 3,691,689 | 9/1972 | Goff | 51/9 M |
| 3,756,377 | 9/1973 | Goff | 51/9 M X |
| 3,877,175 | 4/1975 | Snyder | 51/9 M |
| 3,900,969 | 8/1975 | Diehn | 51/9 M |
| 3,934,372 | 1/1976 | Piehn et al. | 51/425 |
| 3,981,104 | 9/1976 | Dreher | 51/429 X |
| 4,035,958 | 7/1977 | Nishio | 51/425 |

Primary Examiner—James G. Smith
Attorney, Agent, or Firm—Bernard, Rothwell & Brown

[57] ABSTRACT

A mobile apparatus for treating substantially horizontal surfaces with particulate abrasive is provided with means for enhanced recovery of spent abrasive. Abrasive is propelled to the surface being treated at an angle such that particles rebound from the surface into a collection chute which attenuates the kinetic energy of the abrasive to facilitate recycling abrasive for reuse in the apparatus. Abrasive which is not recovered by its rebounding, passes to a rotating broom to be propelled into a collection bin for recycling for reuse in the apparatus.

34 Claims, 6 Drawing Figures

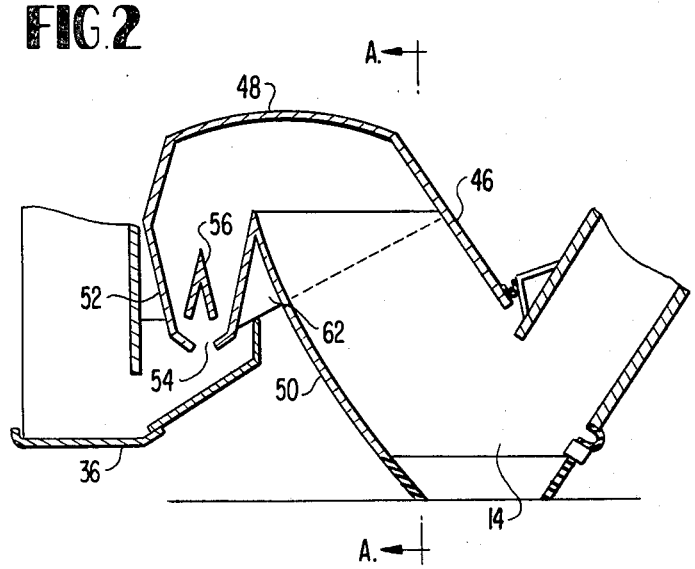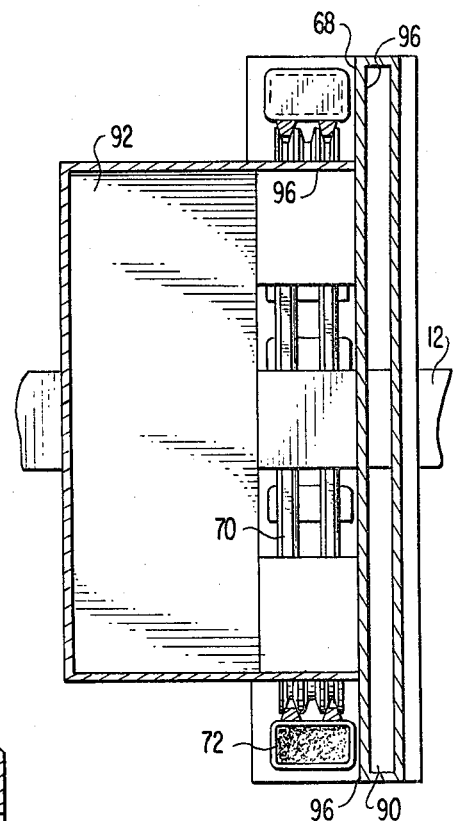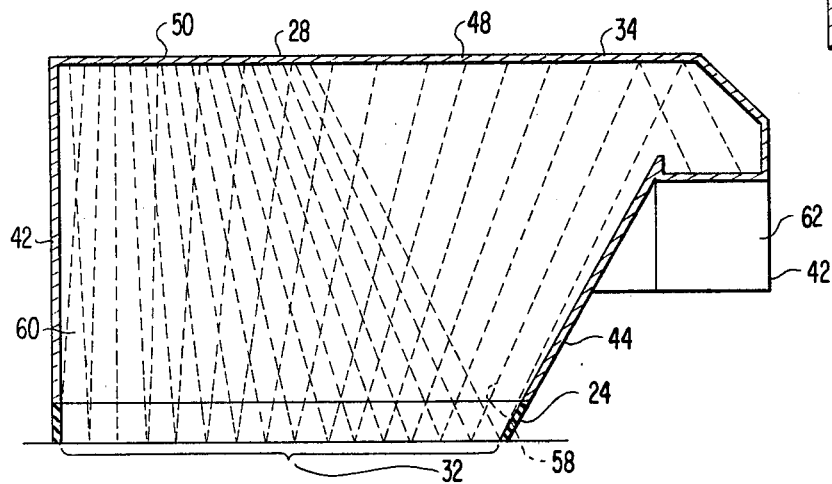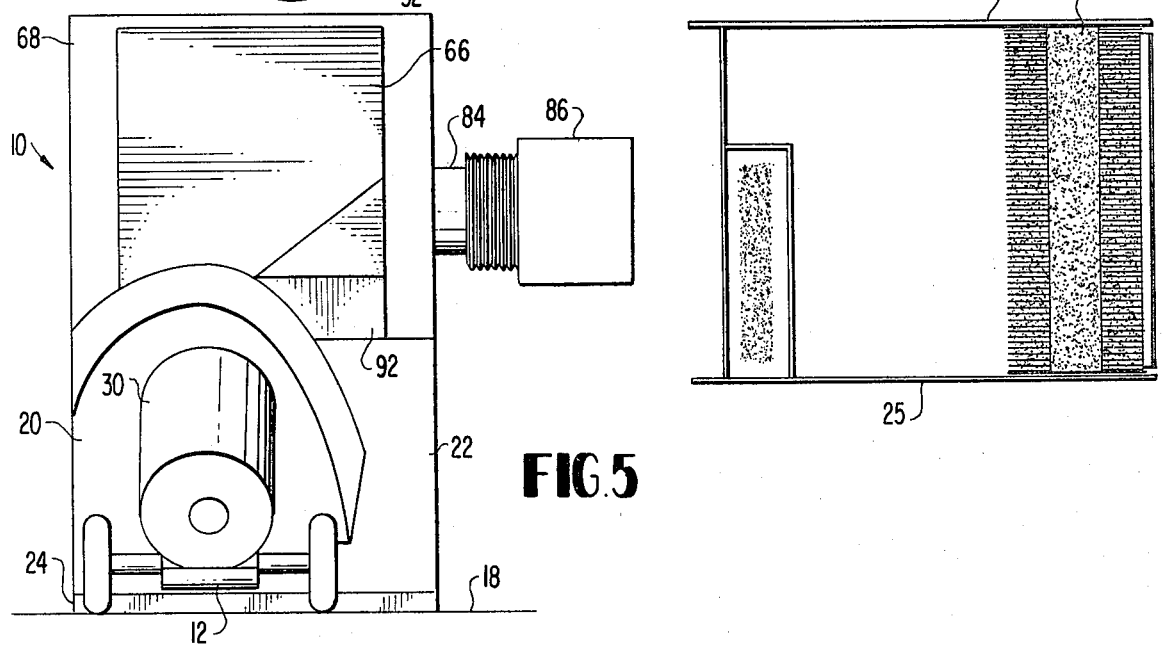

SURFACE TREATING APPARATUS

This invention relates to mobile surface treating apparatus in which abrasive is impacted against the surface to be treated, removed from the surface to prevent substantial accumulation of spent abrasive on the surface, and recycled for subsequent use in the apparatus.

The cleaning of large surfaces, e.g., metal, concrete and the like, may be periodically desired, for instance, to prepare the surface for painting. In the past, air blasting with crushed slag or sand has been employed to clean the surface; however, air blasting requires compressed air which is often expensive and often contains moisture such that, for instance, reoxidation of a treated metal surface may be enhanced prior to the application of protective coatings. Additionally, air blasting generally requires a large labor force. Moreover, the abrasives commonly employed in air blasting such as crushed slag are subject to considerable disintegration on impact with the surface being treated, and thus are generally not recycled. Further labor is required to effect clean-up of spent abrasive in the area of the surface treating operation. Also, air blasting can be an environmental hazard due to the excessive amounts of dust created, and thus, protective equipment must often be provided to insure the safety of personnel in the area of the surface treating operation.

As an alternative, it has been proposed to employ centrifugal blasting wheels to propel particulate abrasive at high velocity against the surface being treated and to recover the abrasive for reuse. Apparatus employing centrifugal blasting wheels and means for recovery of spent abrasives are disclosed, for instance, in U.S. Pat. No. 3,691,689. In accordance with that patent, spent abrasive is swept into a collection bin by a rotating broom positioned behind the blast area. Such apparatus having significantly decreased the operating costs for treating surfaces, and since the blast area can be enclosed, the escape of dust from the system can be minimized, thereby increasing the safety of personnel in the area of treatment as compared to conventional air blasting operations.

Other proposals for surface treating apparatus have included the use of the kinetic energy of the abrasive to rebound abrasive from the surface being treated to a collection hopper for gravity feed to a centrifugal throwing wheel. For instance, in U.S. Pat. No. 3,977,128 to James R. Goff, there is disclosed an abrasive throwing machine wherein abrasive is projected by a centrifugal throwing wheel to impact the surface being treated at an inclined angle and has a predetermined angle of rebound into a rebound path. In order to direct the rebounding abrasive to a storage hopper which is positioned above the centrifugal throwing wheel, rotary brushes are employed. Moreover, the blast pattern is concentrated in a relatively narrow width, i.e., about 18 inches wide from a wheel having a diameter of 12 inches, such that the amount of abrasive striking on the sides of the enclosure is relatively small.

In accordance with my invention mobile surface treating apparatus are provided which enhance recovery of spent abrasive. Advantageously, the enhanced recovery of spent abrasive can be accomplished without increasing the energy requirements of the apparatus, and frequently, the energy requirements for recovery of the abrasive can be significantly reduced. Furthermore, the versatility of the surface treating apparatus of my invention is increased in that the apparatus may be operated at slow speeds, or even be stationary with respect to the surface being treated, and be operated in forward or reverse, with recovery of spent abrasive and without undue masking of the surface being treated by an accumulation of spent abrasive. Moreover, in an aspect of my invention, advantageous air flow patterns are provided which assist in the recovery of spent abrasive and insure minimal escape of dust to the environment. The air flow patterns can also serve to enhance the separation of waste materials such as paint and rust from the abrasive within the apparatus. Large, low density waste particles can be exhausted from the apparatus without undue loss of abrasive and without employing large separation zones which may detract from the mobility of the apparatus. In another aspect of my invention, particulate abrasive is propelled by a centrifugal blasting wheel in a wide, fan-shaped pattern, and the spent abrasive is efficiently recovered for recycle.

The surface treating apparatus of my invention comprises an enclosure with an opening adapted to confront a surface to be treated, a projecting means within the enclosure for propelling a stream of particulate abrasive through the opening to provide a blasting zone, or pattern, on the surface, a chute for directing rebounding abrasive from the blasting zone to a collection bin, and recycling means for cycling abrasive from the collection bin to the projecting means. Thus, the device of this invention effectively utilizes the kinetic energy of rebounding particles in recovering the particles and returning them to a storage hopper for feeding to the projecting means. The walls of the chute are oriented such that rebounding abrasive which strikes them is directed toward the collection bin.

In an aspect of my invention, the chute also serves to attenuate the kinetic energy of the abrasive particles such that they do not enter the collection bin with such force that they rebound out of the collection bin. In order to provide the desired attenuation of the kinetic energy of the abrasive, the chute is provided with an attenuation zone having reduced cross-sectional area such that abrasive strikes the walls of the zone thereby decreasing its kinetic energy. Also, the attenuation zone can be provided with a restriction, which is essentially impermeable to the abrasive, over which the abrasive must pass to enter the collection bin and thus additional kinetic energy attenuation surfaces are provided. The chute is preferably a generally inverted U-shape with an essentially abrasive-impermeable restriction separating an upwardly directed concentrating zone from the attenuation zone. The attenuation zone is generally downwardly directed and is terminated with a discharge opening for discharging abrasive to the collection bin. The chute can be relatively small and yet direct abrasive to the collection bin at relatively low kinetic energy levels. The ability to employ a relatively small chute not only permits the recovery of increased amounts of abrasive without supplemental means to assist in motivating abrasive to the collection bin, but also reduces the weight of the apparatus which is an essential consideration for apparatus for treating, for instance, tops of oil storage tanks.

In another aspect of my invention, the apparatus can treat surfaces adjacent to obstructions to the apparatus while still employing the rebounding of abrasive for recovery and a wide blast pattern. In accordance with this aspect of the invention, a centrifugal blasting wheel is oriented such that the leading edge of the blast pattern is adjacent to one side of the opening, and the abrasive striking the leading edge of the blast pattern is projected in a plane parallel to the axis of the blasting wheel such that the side wall of the enclosure need not extend beyond the opening adjacent to the lead edge of the blast pattern. It is thus apparent that undue striking of the side wall with rebounding abrasive can be abated which striking may unduly attenuate the kinetic energy of the abrasive and hinder its recovery by rebounding.

In a further aspect of my invention, the enclosure is provided with a sealing means surrounding the periphery of the opening and adapted to restrain the undesired escape of abrasive. The sealing means is advantageously adapted to direct abrasive which has not rebounded into the collection bin to a rotary broom behind the opening which picks up and directs the abrasive to the collection bin. Thus, additional abrasive can be recovered within the apparatus for recycle. Due to the attenuation of the rebounding abrasive, the abrasive can be delivered to a collection bin which also can serve as a collection bin for abrasive picked up by the rotary broom. The bounding action of the abrasive which passes to the broom is desirably attenuated such that the abrasive contacts the broom at a point where it can be directed into the collection bin. This attenuation may be provided by, for instance, the resilient seal or other essentially abrasive impervious restriction between the opening and the broom.

In another aspect of my invention, the apparatus are substantially closed systems allowing little grit or dust to reach the atmosphere. The apparatus are preferably provided with means to separate the dust and debris from the spent abrasive employing air circulation patterns. Air circulation means preferably channels the flow of air through the chute, thus assisting in directing rebounding abrasive into the collection bin, and increasing the recovery of spent abrasive. The air flow can also serve to remove dust and debris from the abrasive passed to the collection bin by being drawn through the collection bin. The air can be passed to a plenum which reduces the velocity of the air to separate entrained abrasive. The air laden with dust and debris can be passed to the atmosphere or a dust collection system. The means for separating waste materials from the abrasive can conveniently be positioned in the apparatus so as to not unduly restrict the mobility of the apparatus, and can be relatively compact.

These and other aspects and advantages of the present invention are more apparent in the following detailed description, particularly when considered in conjunction with the accompanying drawings in which like parts are designated by like reference numerals. In the drawings:

FIG. 2 is a schematic sectional, side elevation view from the obverse side of the enclosure of the apparatus of FIG. 1;

FIG. 3 is a schematic sectional front elevation view along line A—A of FIG. 2 further illllustrating the enclosure of the apparatus of FIG. 1;

FIG. 4 is a schematic cross-sectional view along line B—B of FIG. 1 illustrating the air circulation system of the apparatus;

FIG. 5 is a schematic front elevation view of the apparatus of FIG. 1; and

FIG. 6 is a schematic bottom view of the apparatus of FIG. 1 illustrating a blast zone, a sealing means, and a rotary broom.

Figure 1:
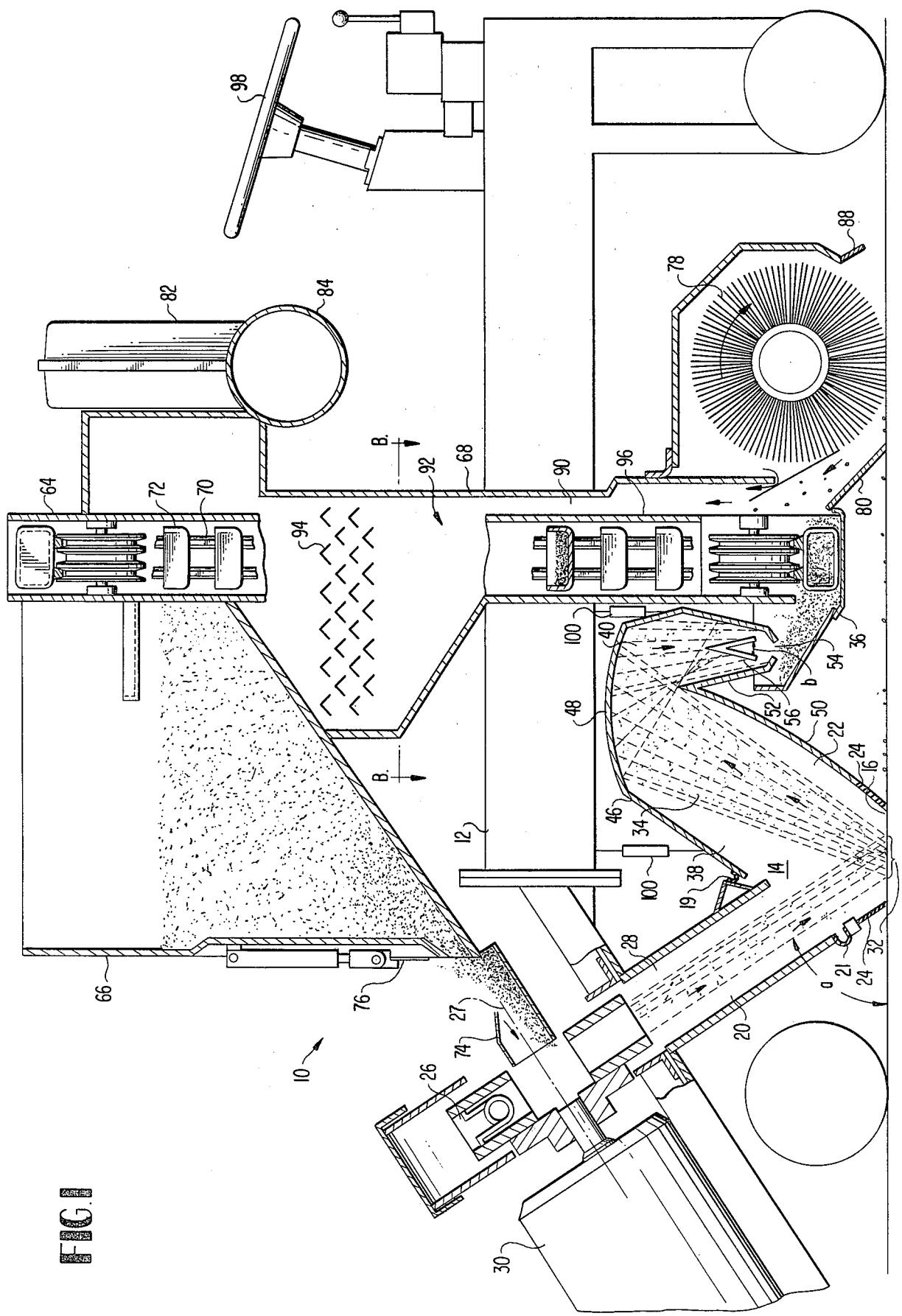
FIG. 1 is a schematic sectional, side elevation view of a mobile, surface treating apparatus in accordance with the present invention.

With reference to the drawings, an abrasive blasting apparatus generally designated by the numeral 10 is adapted for treating surfaces, preferably generally flat and substantially horizontal surfaces. The apparatus comprises frame 12 and enclosure 14 suspended therefrom having opening 16 therein which is adapted to confront surface 18 which is treated with particulate abrasive. Enclosure 14 is illustrated as having two sections, delivery section 20 and chute section 22. Enclosure 14 can be fabricated from light-weight material, such as thin-gauged steel or aluminum. Portions of the enclosure coming in contact with the abrasive may be lined with a replaceable, abrasion-resistant material, e.g. steel plate. Resilient seal 24 is provided around the periphery of opening 16 of enclosure 14 to substantially restrain the escape of abrasive from the enclosure. The resilient seal is preferably comprised of a material that is sufficiently flexible to pass over or around minor obstructions present on the surface being treated. The rear portion of the seal permits spent abrasive material to pass under its edge when the apparatus moves across the surface being treated for recovery by a following rotary broom. Elastomeric materials for the purpose are well-known in the art such as natural rubbers, synthetic rubbers, and other elastomeric materials, including polyurethane elastomers, butadiene rubbers and the like. As shown in FIG. 6, side resilient seals 23 (left side) and 25 (right side) are also provided.

Centrifugal blasting wheel 26 is provided within enclosure 14 for projecting a stream of particulate abrasive 28 to surface 18 being treated and is driven by high-speed electric motor 30. Frequently conventional, commercially-available centrifugal blasting wheels are operated at about 1000 to 4000 rpm. Other projecting means such as those utilizing compressed gas streams rather than centrifugal force might alternatively be used but are generally less preferred. Centrifugal blasting wheel 26 is illustrated as rotating in a plane which is at an angle to the surface being treated, and thus the abrasive strikes the surface at an angle in blast pattern 32. The blast pattern is generally oblong with a major dimension and a minor dimension. When the abrasive impacts the surface being treated at an angle, e.g., an acute angle along the major dimension of the pattern, the abrasive has a motion component parallel to the plane of the surface being treated which assists in lifting debris from the surface. The orientation of centrifugal blasting wheels is preferably such that abrasive strikes the surface at an angle of incidence counter to the forward movement of the apparatus; however, alternatively, the orientation of the wheel may be such that abrasive has an angle of incidence normal to the surface or coincident with the forward movement of the apparatus. Frequently, the abrasive is projected at an acute angle designated by "a" in the drawing of at least about 30°, preferably about 45° to 75°, relative to the surface. The abrasive, due to the high speeds at which it is propelled to the surface, will rebound from the surface. The angle to the surface at which the abrasive rebounds, i.e., the angle of reflectance, will depend upon the angle of incidence of the abrasive, the configuration of the abrasive and surface being treated at the point of impact, the action of the abrasive on the surface and the like. Generally, the angle of reflectance is diffuse as depicted by stream 34 since the abrasive and surface being treated frequently have irregular surfaces. Often a majority, e.g., at least about 60 or 75 weight percent, of the abrasive rebounds within about 15° or 20° of the theoretical angle of reflection. An angle of incidence which is not normal to the surface assists in the recovery of abrasive by rebounding since the spent abrasive can generally be directed towards collection means without significantly interfering with abrasive being propelled to the surface.

The projected abrasive has substantial amounts of kinetic energy and some of this energy is depleted due to the action of the abrasive on the surface being treated and by impact with other abrasive and the walls of the enclosure. Hence, the kinetic energy of rebounding abrasive may widely vary with some particles having little, if any, kinetic energy and others having substantial kinetic energy. The apparatus of my invention is provided with chute 22 for recovering the abrasive through its rebounding action by directing the abrasive to collection bin 36 and for reducing the kinetic energy of the high kinetic energy abrasive particles so that abrasive does not ricochet from the collection bin. Chute 22 is adapted to direct the diffuse stream of rebounding abrasive to the collection bin and is provided with concentration section 38 and attenuation section 40. The concentration section comprises side walls 42, side chute wall 44, upper walls 46 and 48, and rear wall 50 off of which abrasive can ricochet and at least a portion will be directed to the attenuation section for passage to the collection bin. The walls are depicted as having curvilinear portions which are adapted to provide a desired reflectance angle to direct abrasive impinging thereon to the attenuation section. Abrasive may strike one or more of the walls of concentration section 38 prior to being directed to the attenuation section, and this impact may assist in reducing the kinetic energy of the abrasive. In order to collect a substantial portion of ricocheting stream 34, the entrance area of concentration section 38 should have a sufficiently large cross-sectional area to encompass the blast pattern and extend as close to the surface being treated as is practical.

Chute 22 is depicted as having a generally inverted U-shape with the concentration section 38 forming the upwardly directed portion and the attenuation section 40 being downwardly directed. The attenuation section is illustrated as following the concentrating zone in the direction of the angle of reflectance of the abrasive. Thus, the general lateral movement of the abrasive need not be altered in directing the abrasive to the collection bin. The attenuation section serves to further reduce the kinetic energy and thus the momentum of the abrasive. The attenuation section is depicted as having walls 52 which are tapered inward to discharge opening 54. Walls 52 are oriented at sufficiently steep angles such that abrasive which impacts against them does not generally tend to ricochet out of the attenuation section. Baffle 56 is provided in attenuation section 40 to minimize the amount of abrasive ricocheting from the attenuation section and to reduce the kinetic energy of the abrasive prior to being passed to collection bin 36. As shown in the drawings, the baffle is in the configuration of an apex having relatively steep sides depicted at angle "b" which often is about 10° to 30°. Thus, abrasive can ricochet between the baffle and the walls to attenuate the kinetic energy. As shown, the baffle terminates before reaching the bottom of attenuation section 40 and the baffle is directly above and has a width greater than discharge opening 54 to retard direct flow of high kinetic energy particles to the collection bin. Thus, relatively low kinetic energy abrasive can be delivered to the collection bin.

The stream of impacting abrasive 28 from centrifugal blasting wheel 26 is a fan-shaped stream and the blast pattern may have a width of 30 inches or more. As a result, abrasive ricochets to the sides of the blast zone as well as toward the rear. Generally, following edge 58 of the blast pattern from a centrifugal blasting wheel is at a greater angle to vertical than the leading edge 60. Thus, leading edge 60 of the blast pattern may be adjacent to the side of the apparatus thereby permitting surfaces close to obstructions or edges to be treated, and the rebounding abrasive need not unduly impact against the adjacent side wall 42. The abrasive striking the leading edge of the blast pattern advantageously has an angle of incidence in a plane substantially parallel to axis 27 of the centrifugal blasting wheel to retard lateral rebounding of the abrasive at the leading edge. Conveniently, the centrifugal throwing wheel can be offset towards the leading edge side to facilitate providing a desired incidence angle at the leading edge of the blast pattern. The abrasive striking the leading edge of the blast pattern is propelled by the wheel in a plane substantially perpendicular to the surface and parallel to axis 27. The abrasive impacting toward the following edge of the blast pattern, due to its greater angle of incidence, will tend to be reflected at a greater angle. The abrasive at the following edge is therefore propelled by the wheel in a plane inclined to the surface being treated and parallel to axis 27. As depicted in FIGS. 2 and 3, enclosure 14 is extended laterally on the side adjacent the following edge of the blast pattern such that abrasive does not unduly contact the side wall of chute 22, i.e., a wall substantially parallel to the minor dimension of the blast pattern at the following edge, and does not lose excessive kinetic energy such that recovery of abrasive is deleteriously affected. Recovery of this laterally rebounding abrasive is enhanced by a side chute comprising side wall 44 which is adapted to direct abrasive impinging thereon towards the collection bin. Laterally beyond side wall 44 is inclined chute 62 which directs abrasive into attenuation section 40 and collection bin 36. Opening 16 can be of any suitable configuration, and because of the generally oblong blast pattern, the opening is often of an oval or rectangular configuration.

Abrasive is passed from chute 22 to collection bin 36 for elevation for recycle to the centrifugal blasting wheel by elevator 64. Elevator 64 conveys the spent abrasive material from the collection bin to storage hopper 66 and, as depicted, is comprised of an outer housing 68 surrounding an endless belt or chain 70. The continuous belt or chain has attached at intervals scoops or buckets 72. In operation, a particular scoop or bucket is empty on the vertical downpath of the continuous elevator loop. As it passes horizontally through collection bin 36, the scoop is in a vertical collecting position. Continuing on the vertical up-path, the scoop is full of abrasive particles which are dumped into hopper 66 for collection as the scoop passes horizontally across the top of the elevator means. Preferably, the scoops do not contact the inner surface of housing 68 or the bottom of collection bin 36 when passing therethrough. Other elevating means such as pneumatic lift devices may also be used in the apparatus of this invention. The abrasive is stored in hopper 66 which is of a sufficient size to contain adequate reserves of abrasive material for surface treating. Hopper 66 is in communication with centrifugal blasting wheel 26 via feeding passageway 74. Valve 76 is provided at the exit aperture of hopper 66 and may be opened to provide a desired flow of abrasive from the hopper through the passageway and to the blasting wheel. The desired rate of flow is influenced by numerous factors, such as the size of the blasting wheel, the type of abrasive, the power available to the wheel, the type of surface being treated and the desired effect thereon. A normal rate of abrasive flow is frequently about 25 to 1000 pounds per minute, e.g., about 250 to 750 pounds per minute.

A large portion of the abrasive passes into collection bin 36 by means of rebounding through chute 22. However, some of the abrasive may have lost sufficient kinetic energy that it does not rebound through chute 22 and is not impacted by new high velocity abrasive to impart sufficient kinetic energy thereto to provide for recovery by rebounding through chute 22. In an aspect of this invention, abrasive not recovered by rebounding through chute 22 is recovered by rotary broom 78 in a certain relationship with collection bin 36 and chute 22. To prevent an undue accumulation of particles, resilient seal 24 is adapted to permit abrasive, especially abrasive having low kinetic energy, to pass under its rear portion upon the forward movement of the apparatus across the surface being treated. Advantageously, flap 80 is provided between the blasting zone and rotary broom 78 to direct the abrasive toward the rotary broom. Flap 80 is adapted to further attenuate the kinetic energy of the abrasive prior to contacting the broom, e.g., by the flap being in a slanted orientation and it may be constructed of a resilient material to further absorb kinetic energy. The flap can be affixed to the rear collection bin 36 to assist in directing abrasive picked up by the broom to the collection bin. For most efficient recovery, the broom should be slightly wider than opening 16. Side resilient seals 23 and 25 are provided to further assist directing abrasive passing from underneath seal 24 to the rotary broom. The rotating broom has sufficient rotational speed that abrasive recovered from the surface by being projected upwardly and forward, into collection bin 36. Under normal operating conditions, the rotating brush is operated at about 200 to 750 rpm, preferably about 350 to 600 rpm. The bristles may be of any strong erosion resistant material such as nylon, polyolefin, steel, or the like. It is particularly desirable to dislodge and remove all foreign matter, and with the rotating broom contacting the surface undergoing treatment, both the spent abrasive material and the debris resulting from the cleaning of the surface are removed from the surface and additional abrasive is recovered for reuse. By utilizing both chute 22 and the rotating broom in combination, the removal of abrasive and foreign material from the surface is enhanced without significant labor and energy consumption.

The abrasive surface cleaning apparatus depicted in the drawings is essentially a closed system allowing very little grit or dust to reach the atmosphere. With the continuous impacting of abrasive particles on the surface being treated, a great amount of grit and dust is accumulated from the removal of paint, rust and other substances from the surface. Desirably, means are provided for exhausting these contaminants from the blasting zone. Advantageously, even the larger pieces of grit are exhausted from the apparatus since, for example, pieces of rust, paint, and the like, if recycled to impact the surface, may stain the treated surface. In accordance with an aspect of this invention, the separation of powdered abrasive, dust, debris, and the like from reusable abrasive is enhanced by certain air flows in enclosure 14 and elevator housing 68.

Air blower 82, which is depicted in FIG. 1, draws air through collection bin 36 such that light grit and dust particles become entrained therein by sweeping the recovered abrasive. Additionally, the air may be laden with light grit and dust particles by passing through enclosure 14 or around rotary broom 78. Exit duct 84 of blower 82 may be connected to dust collection system 86, or the exhaust may be released directly to the atmosphere. The dust collector can be part of the apparatus or remote from the apparatus, depending mainly upon the weight restriction imposed by the use of the apparatus. Air for circulation and entraining small waste materials may enter the enclosure at several points. For example, air may enter the system around the periphery of resilient seal 24, pass through the blast zone and chute 22, intermingling with the rebounding abrasive and assisting in its recovery, to collection bin 36. The flow of air into the enclosure from between seal 24 and the surface being treated also may serve to pull stray abrasive particles out of cracks under the seal, especially on uneven surfaces, for recovery by rebounding or by the rotary boom. The mouth or entrance area of concentration section 38 is wider than that area immediately prior to the attenuation section 40, and thus the velocity of the air flow through chute 22 is increased in the area of the entrance to the attenuation section thereby enhancing recovery of abrasive. Air can also enter into the enclosure with abrasive being fed to centrifugal blasting wheel 26. Centrifugal blasting wheel 26 not only propels abrasive but also acts as a blower to circulate air in the enclosure. The air stream follows the stream of projected particles through the recovery system and can assist in cooling abrasive after its impact with the surface. Air flap 88 is provided at the rear of rotary broom 78 and air enters in the gap between the flap and the surface being treated. Air flap 88 may be lifted or lowered to regulate the amount of air entering behind the broom and thus it affects the vacuum within enclosure 14.

As illustrated in FIGS. 1 and 4, air flows through collection bin 36 and up air duct 90 which is immediately above and behind the elevator pick up zone of the collection bin. It is apparent that the air circulation system of this invention sweeps through abrasive as it enters collection bin 36. This results in air washing of the spent abrasive for effective removal of foreign material and dust powder from reusable abrasive particles. Air duct 90 widens prior to blower 82 to form an expanded plenum generally designated as 92. This widening results in a decrease in the flow velocity of the air such that usable abrasive which may be entrained in the air can be separated therefrom. The plenum also contains baffles 94 which extend across the plenum and are adapted to enhance the knock-out of entrained abrasive. The air velocity in plenum 92 is, however, sufficient to maintain dust and other waste to be exhausted from the system entrained in the air. Elevator walls 96 are provided such that air drawn across the collection bin does not unduly interfere with the elevation of the abrasive.

Advantageously, the air flow rate is sufficient to draw small, waste particles upwardly through elevator housing 68 to exit port 84. For example, an air flow of about 1000 to 3000 cubic feet per minute has been found adequate for a 50 horsepower blasting wheel. However, the air flow rate should not be so great as to cause undue exhaust of useful abrasive from the system.

The apparatus of the present invention can be self-propelled by providing one or more drive wheels, for instance, near the front of the apparatus, and can be powered by conventional means, for example, hydraulic, electric, internal combustion, or pneumatic drive means. The abrasive surface cleaning apparatus of this invention normally operates, whether self-propelled or externally propelled, at speeds of about 0 to 150 feet or more per minute, depending upon the type of surface being treated and the desired effect thereon. Advantageously, the apparatus is designed so that the operator can vary the speed or even stop the movement of the apparatus without terminating the treating operation. The apparatus can also be provided with a steering handle 98. Controls for regulating the speed of the machine, the speed of the throwing device and the rotational speed of the rotary broom, can be mounted near the steering handle. It will be apparent that the rate of travel of the machine can be adapted to suit a particular application.

The apparatus of my invention may be used on horizontal or slightly inclined surfaces. While the apparatus has been described as being mobile and especially adapted for use in treating substantially flat, horizontally surfaces, it can be operated in a stationary position with the surface being treated moving past the opening in the enclosure. Whether operated in a stationary position or mobilized, the recovery of abrasive utilizing the rebound of the abrasive retards accumulation of abrasive on the surface being treated in such large quantities to deleteriously affect the cleaning action. Thus, the apparatus can continue to treat the surface while stationary, moving slowly, or even moving backward.

The device of this invention may be compact, making it relatively maneuverable. Furthermore, since substantially all of the abrasive material is removed from the surface and recycled by the rebounding and the rotating brush means, the amount of the spent abrasive which is lost is relatively small. This reduces the overall cost of operation, the amount of abrasive material which must be carried by the apparatus, and thus the weight of the machine. Additionally, the energy of the rebounding particles is efficiently utilized to enhance recovery of the abrasive. Moreover, the forward speed of the machine can be changed without surges of spent abrasive particles clogging the recycle mechanism.

When not in operation, it is desirable to elevate seal 24 from the surface such that unnecessary wear does not occur. As depicted in FIG. 1, delivery section 20 of the enclosure is movably attached to chute section 22 wherein opening 16 is defined by chute section 22 and seal 24 is affixed to chute section 22. Also, chute section 22 is not affixed to collection bin 36. Suspension means 100 which are affixed to frame 12 serve to support chute 22 and are adapted to permit, if desired, seal 24 to follow the contour of the surface being treated when the apparatus is in operation independent of the movement of the frame. Mating members 19 and 21 are provided at the movable junction of the delivery section and the chute section to abate loss of abrasive and dust from the enclosure. Also, suspension means 100 serve to elevate chute 22 when the apparatus is not in operation to avoid contact of seal 24 with the surface, and lifting of the delivery section or other portions of the apparatus is not required.

Any type of conventional abrasive material can be used in the apparatus, for example, metal shot, metal grit, sand, glass beads, metal oxide particles, and stone. The choice of the particular materials and the diameter or size thereof, will depend upon the particular application and upon the specific surface composition of the material to be treated. Generally, spherical metal shot is preferred because of its durability and its desirable effect upon the surface being treated. Spherically shaped abrasive particles also give a good blast pattern on the surface and a more predictable angle of reflectance from the surface. However, this apparatus may be used equally well with irregular or angularly shaped particles. Such irregular particles are especially useful when a rough surface is desired, for example, a non-skid surface. Conventionally used shot material will begin to break up and its surfaces will become rough and gritty. This irregular surface causes the particles to ricochet from the surface in an upredictable manner, thus it is important to have the combined recovery systems. Under certain circumstances, it is desirable to use this gritty material in order to produce a rough surface, e.g., a non-skid surface. In this case, it is particularly advantageous to utilize a recovery system which can recover virtually 100% of the spent abrasive. Also, as the abrasive particles begin to break up, their mass is reduced; they will possess less kinetic energy, thereby increasing the probability that the particle will not be captured by rebounding in chute 22. However, the dual recovery system of this invention enables recycling these smaller, but still useful, abrasive particles which might otherwise be lost.

Although the invention has been described with reference to a preferred embodiment, alterations and rearrangements can be made, and still the result would be within the scope of my invention.

It is claimed:

1. An apparatus for the treatment of a surface with particulate abrasive which is projected at high velocity against said surface, comprising an enclosure having an opening therein adapted to confront said surface, wherein said enclosure comprises a delivery section having a projecting means therein for propelling abrasive through the opening to contact the surface; a first collection bin in communication with said projecting means for supplying abrasive thereto; a second collection bin in communication with said enclosure to receive abrasive rebounded from said surface; said second collection bin being below said first collection bin and adapted to receive abrasive directed thereto by the kinetic energy of said abrasive rebounded from said surface; a chute being positioned to convey abrasive rebounded from said surface, said chute having a generally inverted U-shaped having an upwardly directed concentration zone and a downwardly directed attenuation zone having a discharge opening, said upwardly directed concentration zone having walls adapted to direct rebounded abrasive to the attenuation zone wherein rebounded abrasive strikes the walls of the attenuation zone, thereby decreasing the kinetic energy of the abrasive prior to its passing to the discharge opening; said second collection bin being in communication with the discharge opening of said attenuation zone to receive abrasive passing from the discharge opening; and recirculating means in communication with said second collection bin to lift abrasive from said second collection bin to said first collection bin.

2. The apparatus of claim 1 wherein said attenuation zone has a lesser cross-sectional area than that of the concentration zone.

3. The apparatus of claim 2 wherein the projecting means comprises a centrifugal blasting wheel.

4. The apparatus of claim 3 wherein the abrasive is projected at an acute angle to the surface being treated.

5. The apparatus of claim 4 wherein the attenuation zone follows the concentration zone in the direction of the angle of reflectance of the abrasive.

6. The apparatus of claim 3 wherein the attenuating zone contains at least one baffle.

7. The apparatus of claim 6 wherein the baffle is in an upwardly oriented apex configuration with the discharge opening being below the baffle.

8. The apparatus of claim 3 wherein a rotary broom is provided behind the chute which broom is adapted to contact the surface being treated to direct unrecovered spent abrasive to the second collection bin.

9. The apparatus of claim 8 wherein an elevator is in communication with the second collection bin to deliver abrasive therein to the first collection bin which is adapted to supply abrasive to the centrifugal blasting wheel.

10. The apparatus of claim 1 having recovery means for recovering abrasive from said surface for recycle to said projecting means.

11. The apparatus of claim 10 wherein said recovery means is a rotary broom.

12. The apparatus of claim 3 further including an elevator adapted to circulate spent abrasive from the collection bin to the projecting means, a blower adapted to draw air through the enclosure, and an air duct in communication with said collection bin and the blower such that air is drawn from said enclosure across the collection bin to sweep waste material from spent abrasive, said air duct defining a plenum between the collection bin and the blower, said plenum having a sufficiently large cross-sectional area to facilitate separation of entrained abrasive from the air stream.

13. The apparatus of claim 12 wherein at least one baffle is provided in said plenum to facilitate separation of entrained abrasive from the air stream.

14. An apparatus for the treatment of substantially horizontal surfaces with particulate abrasive which is projected at high velocity against the surface being treated comprising a frame, an enclosure comprised of a delivery section attached to said frame, said enclosure having an opening adapted to confront the surface being treated, said delivery section having a projecting means therein for propelling abrasive through said opening to contact the surface being treated, a collection bin for spent abrasive attached to said frame, and a recovery section in movable relationship with said frame and said delivery section, said recovery section being in communication with the delivery section such that the projected abrasive from the propelling means passes through said opening to contact the surface being treated and rebounds into said recovery section; said recovery section directing spent abrasive from said opening to said collection bin; and recirculating means in communication with the collection bin to circulate abrasive from said collection bin to said projecting means.

15. The apparatus of claim 14 wherein a lifting means extends between said frame and said blasting section and is adapted to lift said blasting section.

16. In a mobile apparatus for the treatment of substantially horizontal surfaces with particulate abrasive which is projected at high velocity against the surface comprising an enclosure having an opening adapted to confront the surface being treated, a projecting means within said enclosure for propelling abrasive through said opening to contact the surface, a collection bin for spent abrasive behind the opening, an abrasive recovering means for directing spent abrasive to the collection bin, an elevator adapted to circulate spent abrasive from the collection bin to said projecting means, and a blower adapted to draw air through the enclosure, the improvement comprising an air duct in communication with said collection bin and the blower such that air is drawn from said enclosure across the collection bin to sweep waste material from spent abrasive, said air duct defining a plenum between the collection bin and the blower, said plenum having a sufficiently large cross-sectional area to facilitate separation of entrained abrasive from the air stream.

17. The apparatus of claim 11 wherein the abrasive recovery means comprises a rotary broom behind the collection bin and air is drawn around the rotary broom into said air duct.

18. The apparatus of claim 6 wherein at least one baffle is provided in said plenum to facilitate separation of entrained abrasive from the air stream.

19. A mobile apparatus for the treatment of substantially horizontal surfaces with particulate abrasive which is projected at high velocity against the surface being treated comprising an enclosure having an opening therein adapted to confront the surface being treated, a sealing means surrounding said opening and adapted to contact the surface being treated to establish a sealing contact between the enclosure and said surface, a projecting means for propelling abrasive through the opening in the enclosure, a collection bin in communication with the enclosure to receive rebounding spent abrasive therefrom, an attenuating means in said enclosure to reduce the kinetic energy of the rebounding spent abrasive prior to passing to the collection bin, a rotary broom behind the sealing means and the collection bin adapted to contact the surface and direct spent abrasive passing under the sealing means to the collection bin upon movement of the apparatus, and recirculation means to circulate abrasive in said collection bin to said projecting means.

20. The apparatus of claim 19 wherein the projecting means is a centrifigal blasting wheel having an abrasive inlet and the collection bin is below the abrasive inlet of the centrifugal blasting wheel.

21. The apparatus of claim 19 wherein the enclosure comprises a delivery section having the centrifugal blasting wheel therein for propelling abrasive through said opening and a chute section adapted to receive abrasive from the surface being treated, said chute section being a generally inverted U-shape having an upwardly directed concentration zone and a downwardly directed attenuation zone having a discharge opening in communication with the collection bin, said concentration zone having walls adapted to direct rebounding abrasive to the attenuation zone whereat rebounding abrasive strikes the walls of the attenuation zone, thereby decreasing the kinetic energy of the abrasive prior to its passing to the discharge opening.

22. The apparatus of claim 21 wherein the attenuation zone contains at least one baffle.

23. The apparatus of claim 22 wherein the baffle is in an upwardly oriented apex configuration with the discharge opening being below the baffle.

24. An apparatus for the treatment of a surface with particulate abrasive which is projected at high velocity against said surface, comprising an enclosure having an opening therein adapted to confront said surface, wherein said enclosure comprises a delivery section having a projecting means therein for propelling abrasive through the opening to contact the surface; a first collection bin in communication with said projecting means for supplying abrasive thereto; a second collection bin in communication with said enclosure to receive abrasive rebounded from said surface; said second collection bin being below said first collection bin and adapted to receive abrasive directed thereto by the kinetic energy of aid abrasive rebounded from said surface; a chute being positioned to convey abrasive rebounded from said surface, said chute being adapted to receive abrasive rebounded from said surface and direct rebounded abrasive towards said second collection bin; and recirculating means in communication with said second collection bin to lift abrasive from said second collection bin to said first collection bin.

25. The apparatus of claim 24 having recovery means for recovering abrasive from said surface for recycle to said projecting means.

26. The apparatus of claim 25 wherein said recovery means is a rotary broom.

27. An apparatus suitable for the treatment of surfaces with particulate abrasive which is projected at high velocity against the surface being treated comprising an enclosure having an opening adapted to confront said surface, said enclosure being comprised of a delivery section having a projecting means therein for propelling abrasive into said opening to contact the surface, and a blasting section being in movable relationship with respect to said delivery section, said blasting section having a chute in communication with the delivery section such that projected abrasive from the propelling means passes into the blasting section and said opening, rebounds from said surface and passes through said chute to a collection bin for return to said projecting means.

28. The apparatus of claim 27 wherein a lifting means is adapted to lift said blasting section with respect to said delivery section.

29. An apparatus for the treatment of substantially horizontal surfaces with particulate abrasive which is projected at high velocity against the surface being treated comprising an enclosure having an opening adapted to confront the surface being treated; a centrifugal blasting wheel in said enclosure for propelling abrasive as a fan-shaped stream through said opening in the enclosure to provide a blast pattern on the surface, said blast pattern being oblong with a major dimension and a minor dimension having a leading edge adjacent to one side of said opening and a following edge, wherein said wheel is positioned in said enclosure such that abrasive at said leading edge is propelled by the wheel in a plane substantially perpendicular to said surface and abrasive at the following edge is propelled by the wheel in a plane inclined to said surface; a chute in communication with said opening to receive rebounding abrasive at its angle of reflectance from said surface at the following edge of the blast pattern; a portion of said chute being parallel to the major dimension of the blast pattern and another portion of the chute being parallel to the minor dimension of the blast pattern at the following edge; said chute being of generally inverted U-shape having an upwardly directed concentration zone and a downwardly directed attenuation zone having a discharge opening, said concentration zone having walls adapted to direct rebounding abrasive to the attenuation zone whereat rebounding abrasive strikes the walls of the attenuation zone, thereby decreasing the kinetic energy of the abrasive prior to its passing to the discharge opening, said apparatus further including a collection bin in communication with the discharge opening; said attenuation zone having at least one baffle.

30. The apparatus of claim 29 wherein the baffle is an upwardly oriented apex configuration with the discharge opening being below the baffle.

31. The apparatus of claim 30 wherein a rotary broom is provided behind the chute which broom is adapted to contact the surface being treated and direct unrecovered spent abrasive to the collection bin.

32. The apparatus of claim 31 wherein an elevator is in communication with the collection bin to deliver abrasive therein to a storage hopper which is adapted to supply abrasive to the centrifugal blasting wheel.

33. The apparatus of claim 31 further including an elevator adapted to circulate spent abrasive from the collection bin to the centrifugal blasting wheel, a blower adapted to draw air through the enclosure, and an air duct in communication with said collection bin and the blower such that air is drawn from said enclosure across the collection bin to sweep waste material from spent abrasive, said air duct defining a plenum between the collection bin and the blower, said plenum having a sufficiently large cross-sectional area to facilitate separation of entrained abrasive from the air stream.

34. The apparatus of claim 33 wherein at least one baffle is provided in said plenum to facilitate separation of entrained abrasive from the air stream.

* * * * *

UNITED STATES PATENT OFFICE
CERTIFICATE OF CORRECTION

Patent No. 4,376,358  Dated March 15, 1983

Inventor(s) John J. Shelton

It is certified that error appears in the above-identified patent and that said Letters Patent are hereby corrected as shown below:

Column 1, line 38, "having" should be --have--.

Column 3, line 5, "lead" should be --leading--.

Column 8, line 27, "boom" should be --broom--.

Column 9, lines 27 and 28, "horizontally" should be --horizontal--.

Column 12, line 21, claim 17, "11" should be --16--.

Column 12, line 25, claim 18, "6" should be --16--.

Column 13, line 17, "aid" should be --said--.

Signed and Sealed this

Fourteenth Day of June 1983

[SEAL]

Attest:

DONALD J. QUIGG

Attesting Officer  Acting Commissioner of Patents and Trademarks